United States Patent
Guo et al.

(10) Patent No.: US 9,327,753 B2
(45) Date of Patent: May 3, 2016

(54) WHEEL ASSEMBLY AND STROLLER HAVING THE SAME

(71) Applicant: Wonderland Nurserygoods Company Limited, Kwai Chung (HK)

(72) Inventors: Zheng-Wen Guo, Dongguan (CN); Wan-Quan Zhu, Dongguan (CN)

(73) Assignee: Wonderland Nurserygoods Company Limited, Kwai Chung (HK)

( * ) Notice: Subject to any disclaimer, the term of this patent is extended or adjusted under 35 U.S.C. 154(b) by 0 days.

(21) Appl. No.: 14/671,309

(22) Filed: Mar. 27, 2015

(65) Prior Publication Data

US 2016/0068180 A1 Mar. 10, 2016

(30) Foreign Application Priority Data

Sep. 4, 2014 (CN) .......................... 2014 1 0448580

(51) Int. Cl.
*B60B 33/00* (2006.01)
*B62B 9/18* (2006.01)

(52) U.S. Cl.
CPC .............. *B62B 9/18* (2013.01); *B60B 33/006* (2013.01); *B60B 33/0026* (2013.01)

(58) Field of Classification Search
CPC .......... B62B 7/04; B62B 7/042; B62B 7/044; B62B 7/046; B60B 33/0007; B60B 33/0015; B60B 33/0021; B60B 33/0028; B60B 33/0047–33/0057; B60B 33/0065; B60B 33/0068
See application file for complete search history.

(56) References Cited

U.S. PATENT DOCUMENTS

| 5,774,936 A * | 7/1998 | Vetter | B60B 33/021 16/35 R |
|---|---|---|---|
| 6,336,524 B1 * | 1/2002 | Van Loon | B60B 33/0018 16/35 R |
| 2005/0156086 A1 * | 7/2005 | Patterson | B60B 33/0002 248/188.8 |
| 2006/0279070 A1 * | 12/2006 | Hou | B60B 33/001 280/643 |
| 2010/0175222 A1 * | 7/2010 | Fallshaw | B60B 33/0021 16/35 R |
| 2011/0049967 A1 * | 3/2011 | Cheng | B60B 33/0002 301/111.06 |
| 2012/0255141 A1 * | 10/2012 | Lin | B60B 33/0081 16/45 |
| 2013/0180080 A1 * | 7/2013 | Tsai | B60B 33/0007 16/43 |
| 2014/0317880 A1 * | 10/2014 | Yang | B60B 33/0042 16/29 |
| 2015/0040346 A1 * | 2/2015 | Tsai | B60B 33/0021 16/45 |
| 2015/0096846 A1 * | 4/2015 | Lin | B60B 33/0042 188/1.12 |
| 2015/0258850 A1 * | 9/2015 | Schioppa | B60B 33/021 16/35 R |
| 2016/0009132 A1 * | 1/2016 | Spektor | B60B 33/0076 280/79.11 |

* cited by examiner

*Primary Examiner* — Jeffrey J Restifo
*Assistant Examiner* — Erez Gurari
(74) *Attorney, Agent, or Firm* — Akerman LLP; Peter A. Chiabotti

(57) ABSTRACT

A wheel assembly includes a bottom base fixed with an axle, a wheel assembled to a bottom end of the bottom base, and a mounting base fixed with a mounting sleeve. The axle protrudes out of a top end of the bottom base, and is inserted into the mounting sleeve to assemble the bottom base to the mounting base. A resilient buffering member is sleeved on the axle and is clamped between the mounting sleeve and the bottom base. The resilient buffering member has at least one protruding portion that projects downward from a bottom surface thereof and that abuts against the bottom base.

18 Claims, 7 Drawing Sheets

WHEEL ASSEMBLY AND STROLLER HAVING THE SAME

CROSS REFERENCE TO RELATED APPLICATION

This application claims priority of Chinese Application Number 201410448580.0, filed on Sep. 4, 2014, the disclosure of which is incorporated herein by reference.

FIELD

The disclosure relates to a stroller, more particularly to a wheel assembly having a resilient buffering member and a stroller having the wheel assembly.

BACKGROUND

Strollers are widely used in families that have babies or toddlers. Whether it is indoor or outdoor, strollers are handy for parents to move the babies or toddlers to any desired locations. Strollers provide a safe and comfortable environment for babies and toddlers, and the most important characteristic thereof is that the strollers can be easily and conveniently moved. Such a characteristic is realized by a wheel assembly assembled to a bottom portion of the stroller.

A conventional wheel assembly is composed of many components, and there are many mounting gaps among these components. When an impact from the ground hits the wheel assembly during the operation thereof, the components may bump against each other due to the presence of the mounting gaps, thereby generating noises. Furthermore, the presence of the mounting gaps may cause skewing or rocking of the wheel assembly, so that movement of the stroller is adversely affected.

Therefore, there is a need to improve the conventional wheel assembly so that the noises generated by the wheel assembly can be reduced and the wobbly motion of the same can be avoided.

SUMMARY

An object of the disclosure is to provide a wheel assembly that can alleviate at least one of the drawbacks of the prior arts.

Another object of the disclosure is to provide a stroller having the aforesaid wheel assembly.

According to one aspect of the disclosure, a wheel assembly for a stroller comprises a bottom base fixed with an axle, a wheel assembled to a bottom end of the bottom base, a mounting base fixed with a mounting sleeve, and a resilient buffering member. The axle protrudes out of a top end of the bottom base, and is inserted into the mounting sleeve to assemble the bottom base to the mounting base. The resilient buffering member is sleeved on the axle and is clamped between the mounting sleeve and the bottom base. The resilient buffering member has a bottom surface, and at least one protruding portion that projects downward from the bottom surface and that abuts against the bottom base.

According to another aspect of the disclosure, a stroller comprises a stroller frame and a wheel assembly assembled to a bottom of the stroller frame. The wheel assembly includes a bottom base fixed with an axle, a wheel assembled to a bottom end of the bottom base, a mounting base fixed with a mounting sleeve, and a resilient buffering member. The axle protrudes out of a top end of the bottom base, and is inserted into the mounting sleeve to assemble the bottom base to the mounting base. The resilient buffering member is sleeved on the axle and is clamped between the mounting sleeve and the bottom base. The resilient buffering member has a bottom surface, and at least one protruding portion that projects downward from the bottom surface and that abuts against the bottom base.

BRIEF DESCRIPTION OF THE DRAWINGS

Other features and advantages of the disclosure will become apparent in the following detailed description of the embodiment with reference to the accompanying drawings, of which.

DETAILED DESCRIPTION

The following detailed description of an embodiment of the present disclosure will be clearly presented in coordination with the reference drawings.

Figure 1:
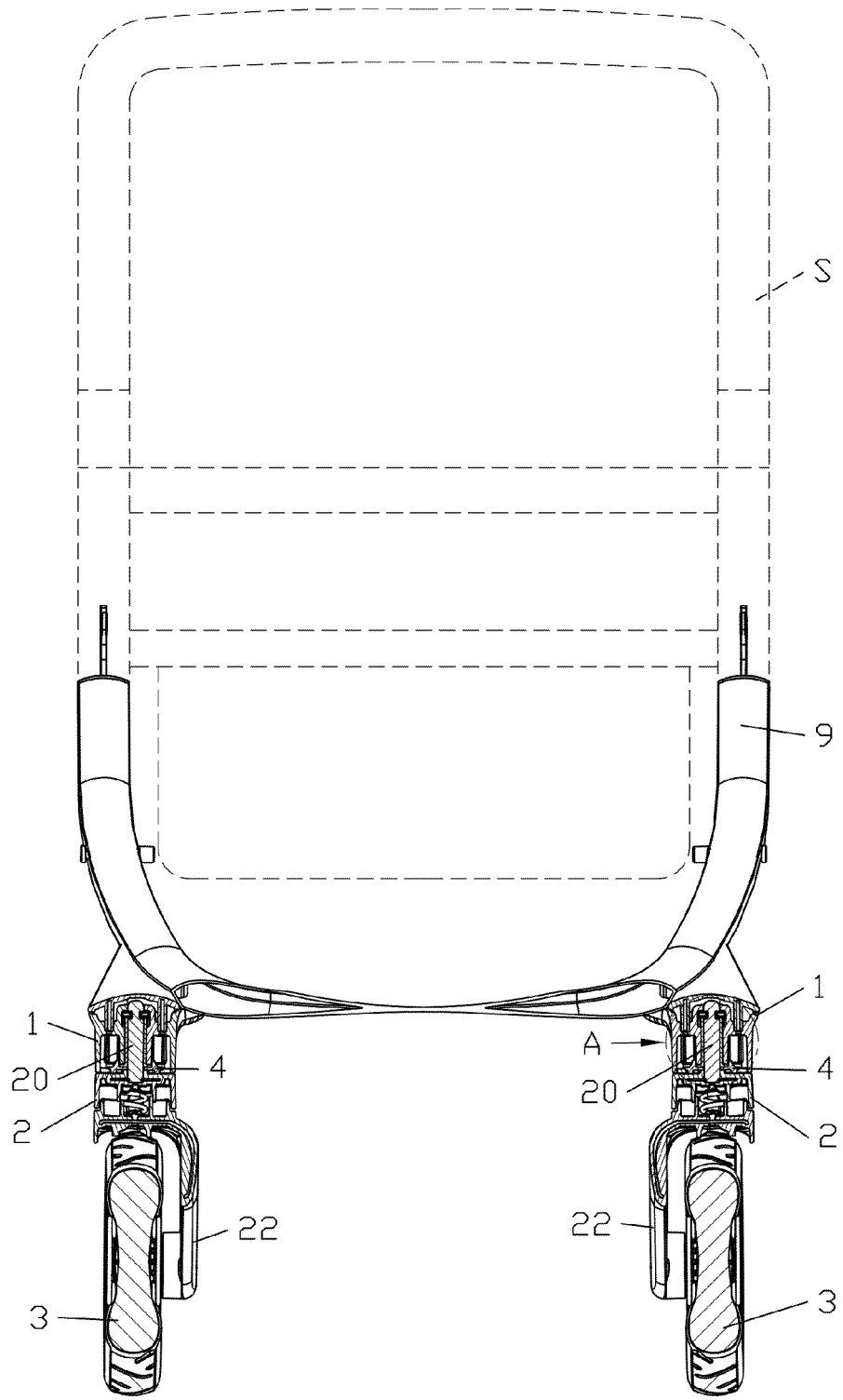
FIG. 1 is a schematic view, illustrating a wheel assembly according to the embodiment of the present disclosure being assembled on a stroller frame of a stroller and being sectioned for clarity of illustration.
Figure 2:
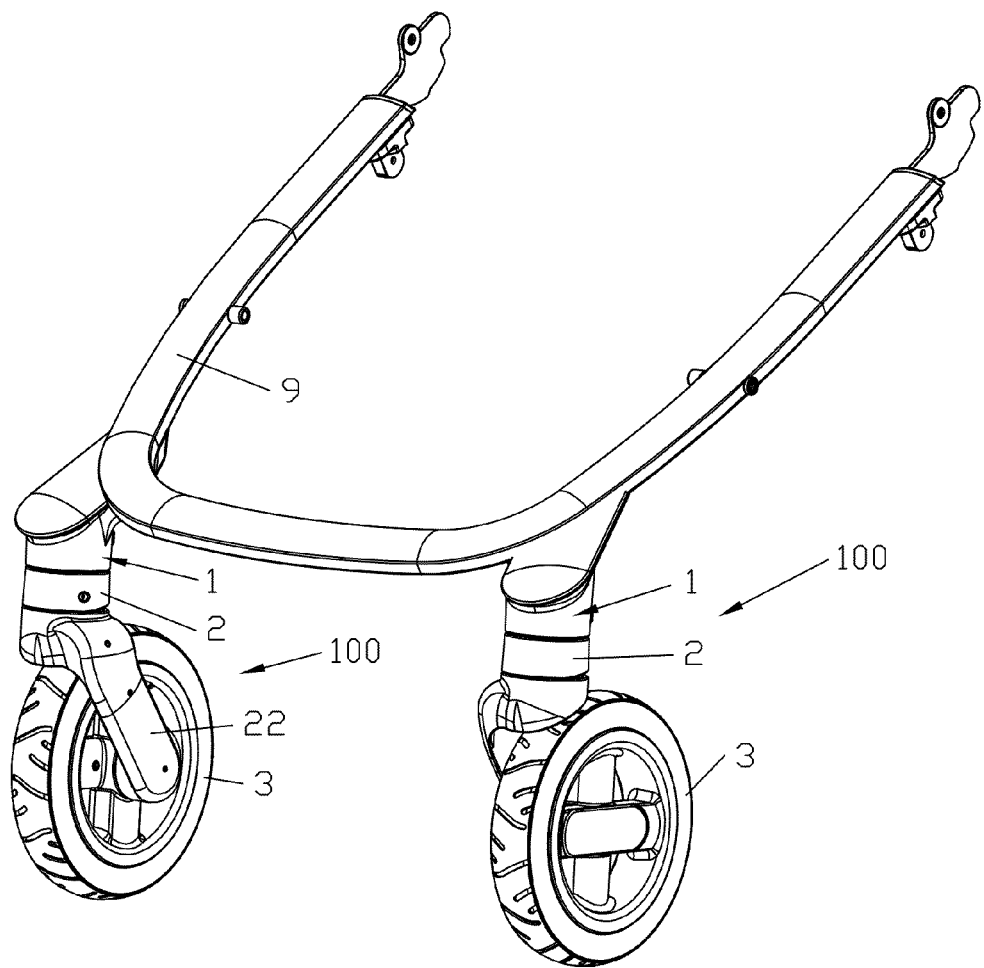
FIG. 2 is a perspective view of the embodiment assembled on the stroller frame.
Figure 3:
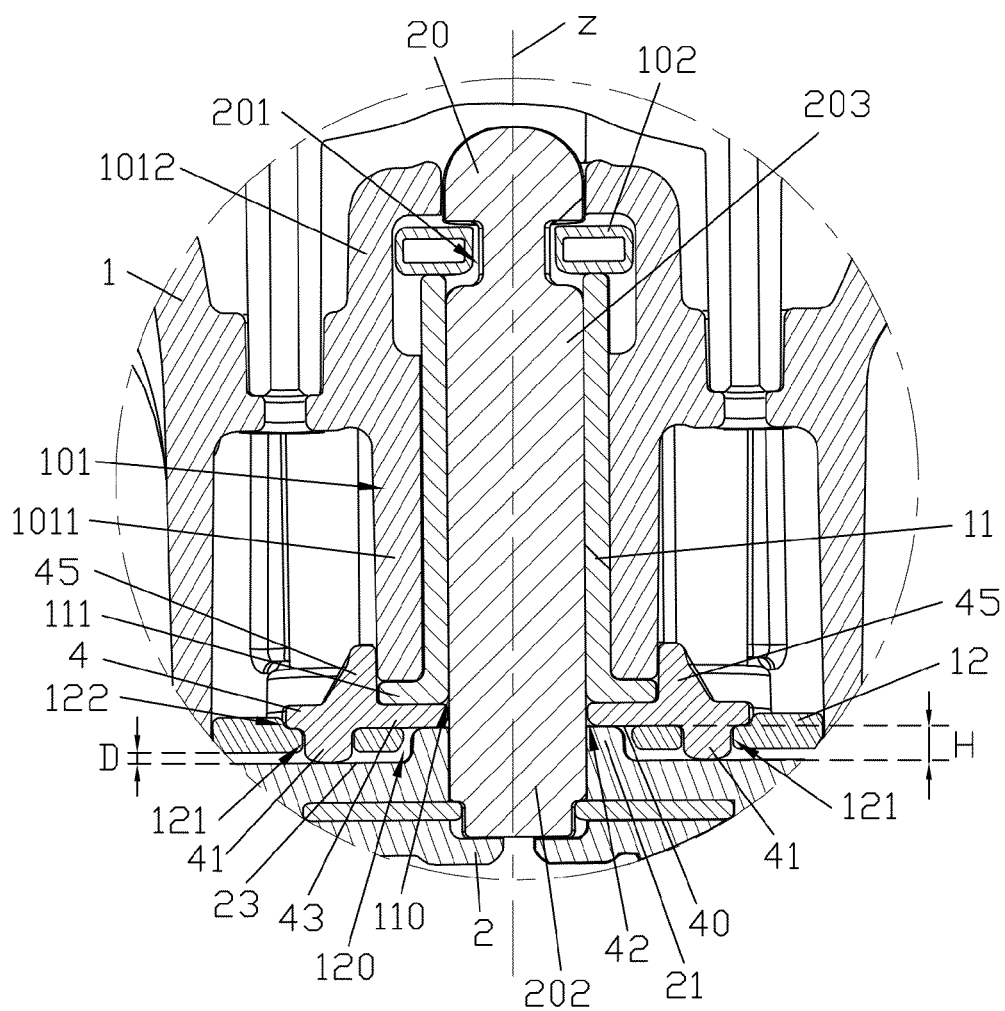
FIG. 3 is an enlarged sectional view of an encircled portion (A) of FIG. 2.

For clarity, FIG. 1 only shows part of the components of a stroller (S) according to the embodiment of the present disclosure. The stroller (S), as shown in FIGS. 1 to 3, comprises a stroller frame 9, and two wheel assemblies 100 assembled to a bottom of the stroller frame 9. Although two wheel assemblies 100 are illustrated in the figures, only one of the wheel assemblies 100 will be described hereinafter since the construction of the wheel assemblies 100 are similar.

The wheel assembly 100 of this disclosure includes a mounting base 1, a bottom base 2, a wheel 3 and a resilient buffering member 4.

The mounting base 1 is fixed with a mounting sleeve 11.

The bottom base 2 is fixed with an axle 20. The axle 20 defines an axis (z), and has a bottom portion 202 fixed to the bottom base 2, and a top portion 203 extending upward from the bottom portion 202. The top portion 203 of the axle 20 extends out of a top surface 23 of the bottom base 2, and is inserted into the mounting sleeve 11 to pivotally assemble the bottom base 2 to the mounting base 1.

The wheel 3 is assembled to a bottom end of the bottom base 2. In this embodiment, a wheel mounting plate 22 is fixed to the bottom end of the bottom base 2, and the wheel 3 is pivotally connected to the wheel mounting plate 22.

Figure 4:
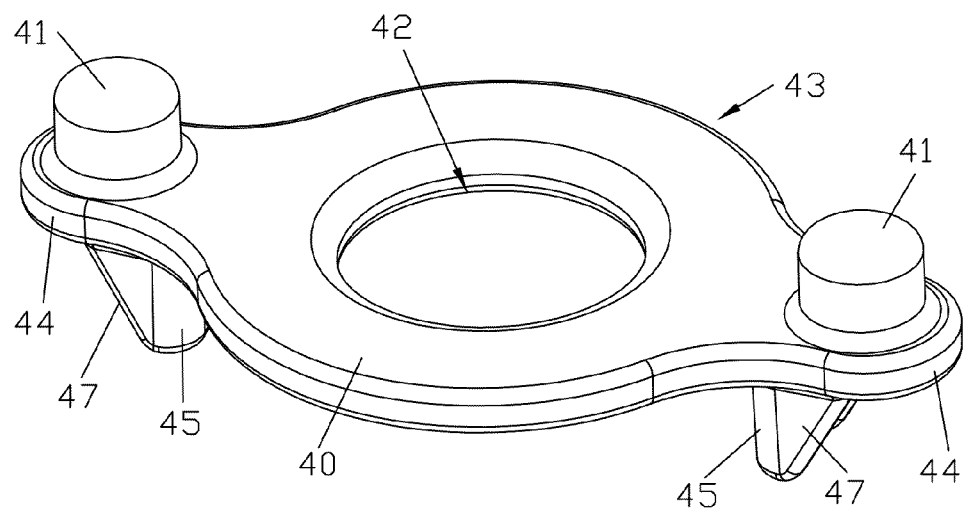
FIG. 4 is a perspective view of a resilient buffering member of the embodiment.
Figure 5:
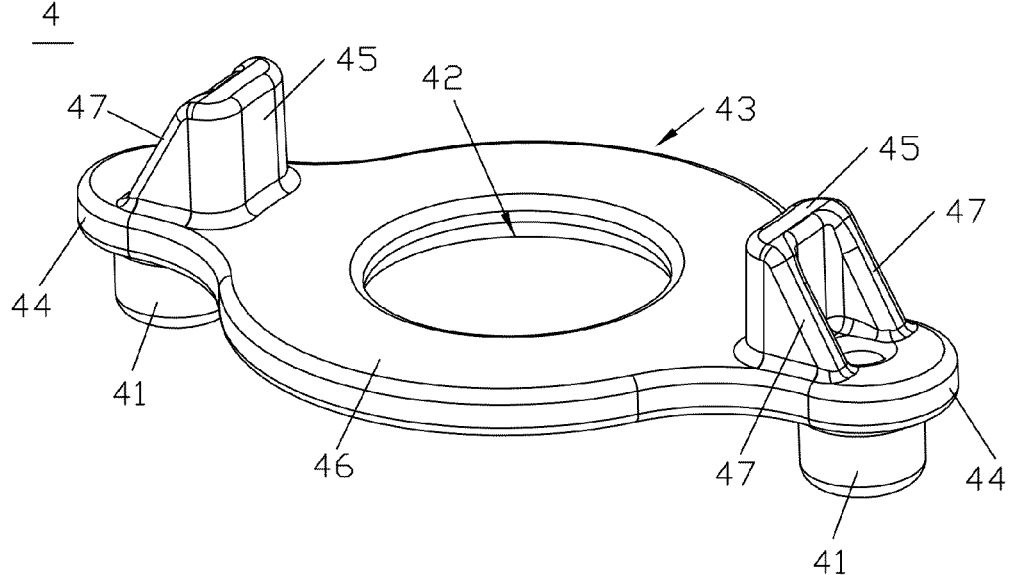
FIG. 5 is a perspective view of the resilient buffering member taken from another angle.

The resilient buffering member 4 is sleeved on the axle 20 and is clamped between the mounting sleeve 11 and the bottom base 2. As shown in FIGS. 4 and 5, the resilient buffering member 4 has a bottom surface 40, a top surface 46, and two protruding portions 41 that project downward from the bottom surface 40 in a spaced apart manner and that abut against the bottom base 2.

The resilient buffering member 4 is disposed between the mounting sleeve 11 and the bottom base 2 so as to prevent impact between the mounting sleeve 11 and the bottom base 2 during operation of the wheel assembly 100. Through this, production of noise can be minimized. Simultaneously, the protruding portions 41 resiliently abut against the bottom base 2 to prevent deviation of the wheel 3. In this embodiment, two protruding portions 41 are exemplified. The two protruding portions 41 are equally spaced apart in a circumferential direction of the axle 20, so that the force can be uniformly transferred between the two protruding portions 41 and the bottom base 2, which can avoid the bottom base 2 to be slanted. The stability of the wheel assembly 100 can thus be maintained.

This embodiment uses an interference fit between each protruding portion 41 and the bottom base 2 to realize abutment of each protruding portion 41 with the bottom base 2. Specifically, if the bottom surface 40 of the resilient buffering member 4 and the top surface 23 of the bottom base 2 are spaced apart by a distance (H) (see FIG. 3), then the length of each protruding portion 41 that protrudes from the bottom surface 40 is larger than the distance (H) prior to assembly of the bottom base 2 to the mounting base 1. Through this, after the bottom base 2 is assembled to the mounting base 1, the protruding portions 41 are pressed by the bottom base 2 to abut thereagainst. The resilient buffering member 4 is made of a resilient material, such as Hytrel 4069.

Referring to FIGS. 4 and 5, in combination with FIG. 3, the resilient buffering member 4 further has two limiting portions 45 protruding upward from the top surface 46 in a spaced apart manner and corresponding to the protruding portions 41, respectively. The mounting sleeve 11 is located between the two limiting portions 45 such that the limiting portions 45 abut against the mounting sleeve 11. The limiting portions 45 are equally spaced apart in the circumferential direction of the axle 20. Each of the limiting portions 45 has two corresponding reinforcing structures 47. Each of the reinforcing structures 47 has a triangular shape, and is connected to the top surface 46 for supporting a corresponding limiting portion 45.

Moreover, the resilient buffering member 4 further has a ring portion 43. The ring portion 43 has two wing parts 44 extending outwardly, radially and oppositely from an outer periphery thereof, and a central through hole 42 between the wing parts 44 for extension of the axle 20 therethrough. The wing parts 44 are equally spaced apart in the circumferential direction of the axle 20. Each of the wing parts 44 has two opposite surfaces respectively formed with one of the protruding portions 41 and a corresponding limiting portion 45. Particularly, the protruding portion 41 is formed on a bottom surface of the wing part 44 (that is, the bottom surface 40 of the resilient buffering member 4), whereas the limiting portion 45 is formed on a top surface of the wing part 44 (that is, the top surface 46 of the resilient buffering member 4).

Each protruding portion 41 is more distal from the axle 20 than the corresponding limiting portion 45. In this embodiment, the ring portion 43, the wing parts 44, the protruding portions 41, the limiting portions 45 and the reinforcing structures 47 are integrally formed as one body. It should be noted herein that the number of each of the wing parts 44, the protruding portions 41, the limiting portions 45 and the reinforcing structures 47 is not limited in this disclosure. In practice, when the number of each of the wing parts 44, the protruding portions 41, the limiting portions 45 and the reinforcing structures 47 is increased, each of these components may be similarly disposed equally spaced apart in the circumferential direction of the axle 20.

Figure 6:
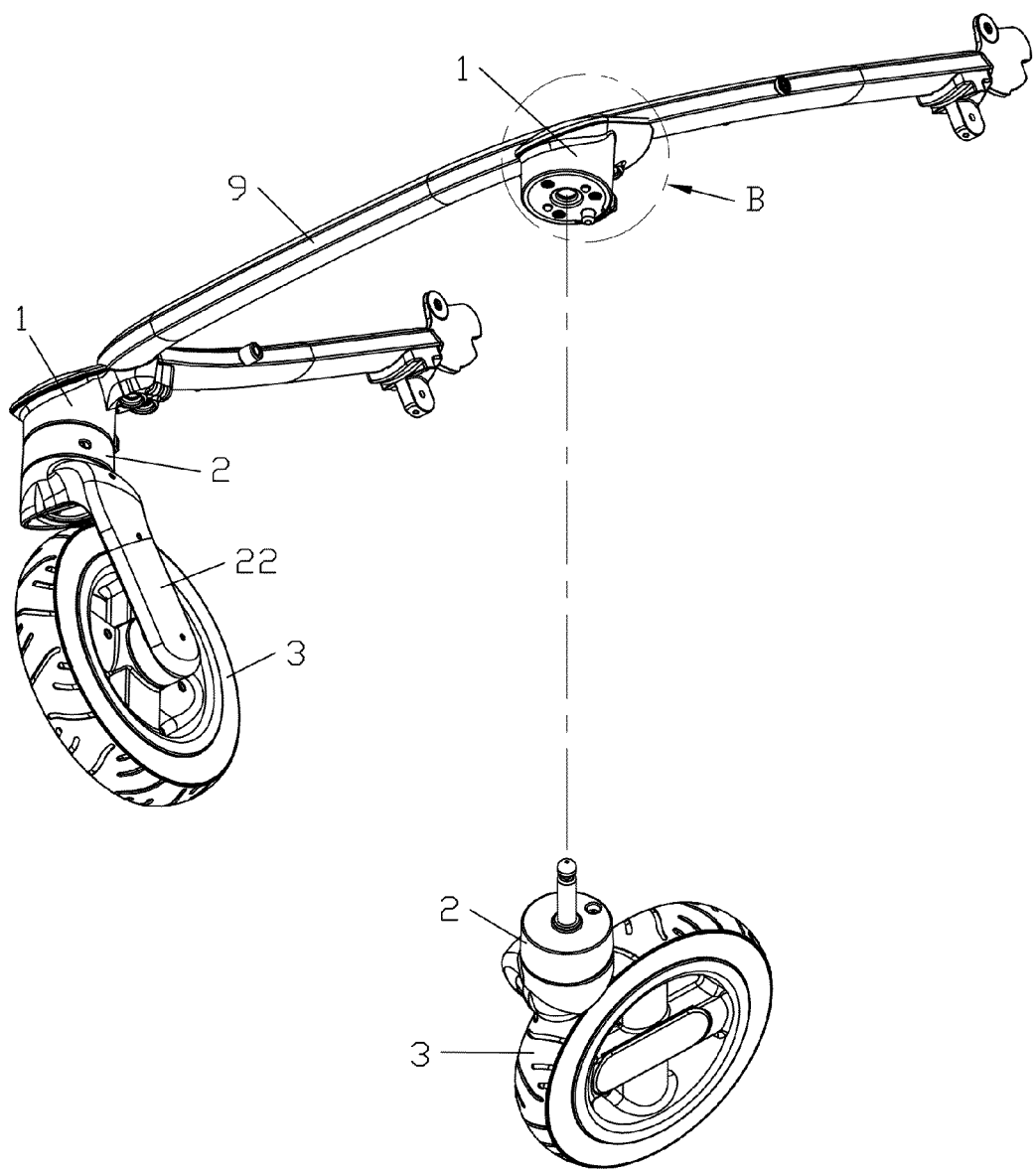
FIG. 6 is a partly exploded perspective view of the embodiment.
Figure 7:
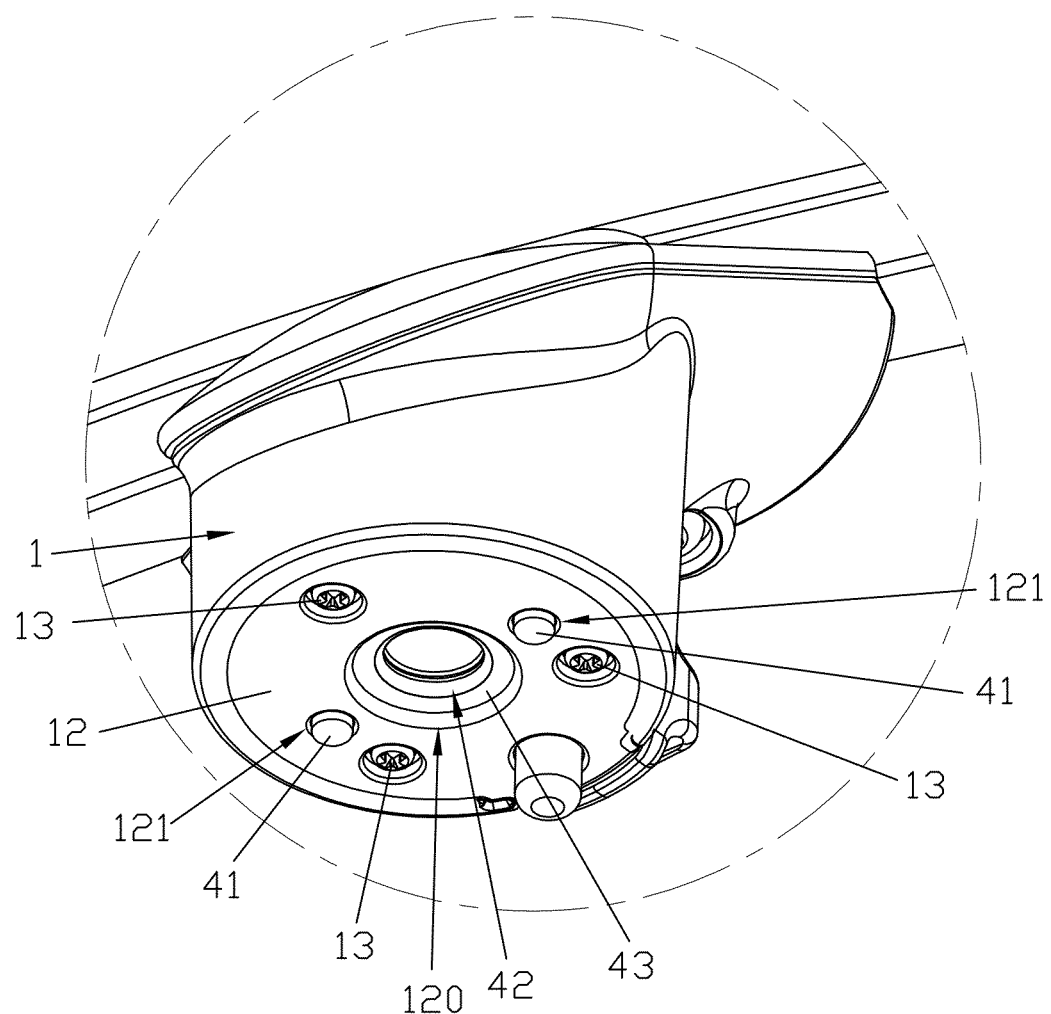
FIG. 7 is an enlarged perspective view of an encircled portion (B) of FIG. 6.
Figure 8:
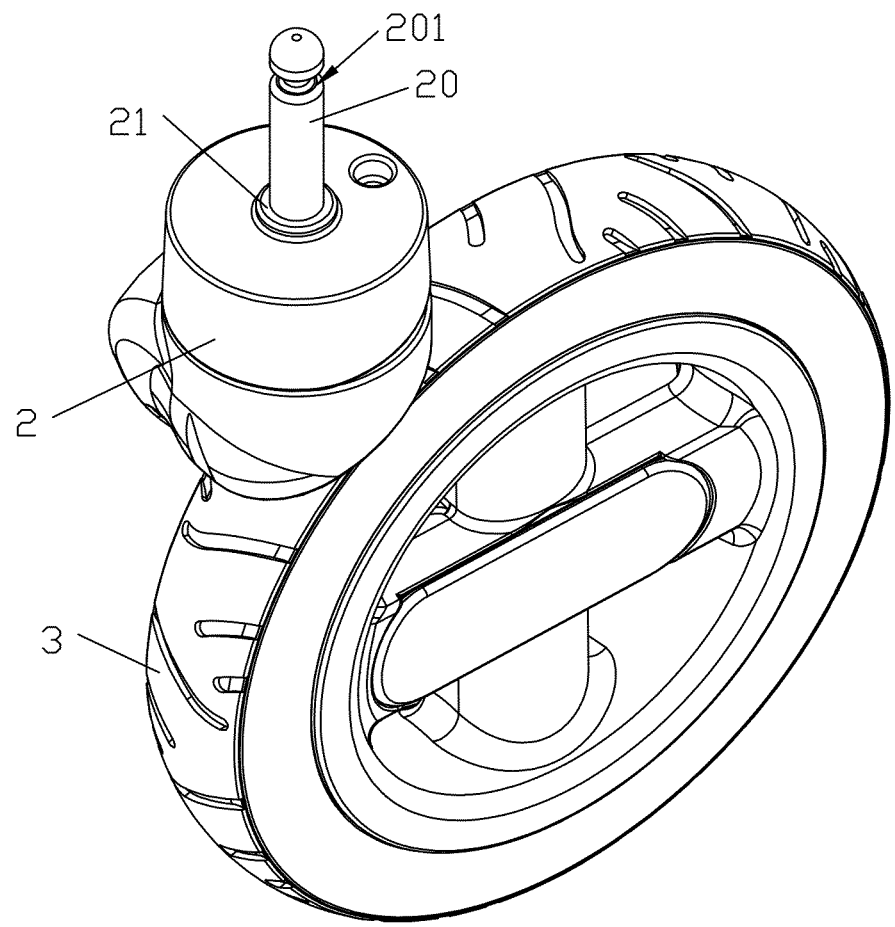
FIG. 8 is an assembled perspective view of a bottom base and a wheel of the embodiment.

Referring to FIGS. 6 to 8, in combination with FIG. 3, a fixed portion 101 and an engaging portion 102 are provided in the mounting base 1. The fixed portion 101 may be integrally formed with the mounting base 1, and has one end having a tubular structure 1011, and the other end having a receiving structure 1012 for receiving the engaging portion 102. The mounting sleeve is received in the tubular structure 1011, and defines a mounting hole 110 for receiving the axle 20. The mounting sleeve 11 has a positioning portion 111 extending outwardly and radially from a bottom periphery thereof to form an annular flange such that the mounting sleeve 11 has an L-shaped cross section. In this embodiment, a long side of the L-shaped mounting sleeve 11 is disposed in the tubular structure 1011, whereas the positioning portion 111 (the short side of the L-shaped mounting sleeve 11) abuts against a bottom end of the tubular structure 1011 to achieve positioning of the mounting sleeve 11 in the mounting base 1. The top portion 203 of the axle 20 is formed with an annular groove 201 proximate to a top end thereof. After the axle 20 is inserted into the mounting hole 110, the engaging portion 102 is engaged to the annular groove 201. The engaging portion 102 may be selectively connected to an operating member (not shown), so that a user can operate the operating member to remove the engagement between the engaging portion 102 and the annular groove 201. In other words, the bottom base 2 of this embodiment can be detachably assembled to the mounting base 1 through the axle 20.

In this embodiment, when the resilient buffering member 4 is assembled within the mounting base 1, two limiting portions 45 abut against the tubular structure 1011 and the positioning portion 111, so that the resilient buffering member 4 is limited along a horizontal direction, thereby preventing movement of the resilient buffering member 4. On the other hand, each protruding portion 41 is more distal from the axle 20 than the corresponding limiting portion 45, so that each limiting portion 45 is located between the positioning portion 111 and the corresponding protruding portion 41. When the protruding portions 41 are pressed by the bottom base 2, the limiting portions 45 abut against the positioning portion 111 and the tubular structure 1011 to prevent the wing parts 44 and the ring portion 43 from bending and deforming. As mentioned above, there is no restriction on the number of the limiting portions 45 in this embodiment, and a plurality of the limiting portions 45 may be disposed equally spaced apart in the circumferential direction of the axle 20, so that the resilient buffering member 4 can easily reach a stable state since force can be uniformly applied to it.

The wheel assembly 100 further includes a cover plate 12 fixed to a bottom portion of the mounting base 1 by using three screws 13, as shown in FIG. 7. However, other connecting members may be used instead of the screws 13. With reference to FIG. 3, the cover plate 12 has a central opening 120 that is registered with the mounting hole 110 for extension of the axle 20 therethrough. The diameter of the opening 120 is larger than that of the mounting hole 110 and that of the axle 20. The cover plate 12 further has two through holes 121 corresponding to the protruding portions 41. The protruding portions 41 respectively extend through the through holes 121 and protrude out of the cover plate 12, so that a clearance (D) is formed between the cover plate 12 and the bottom base 2. Moreover, an inner surface of the cover plate 12 is indented downwardly to form a positioning groove 122 for receiving the resilient buffering member 4 to further position the resilient buffering member 4 in the mounting base 1.

After the bottom base 2 is assembled to the mounting base 1, the central through hole 42 in the resilient buffering member 4 is registered with the mounting hole 110 and the opening 120, and the protruding portions 41 extend respectively and downwardly through the through holes 121 in the cover plate 12. A top surface of the ring portion 43 abuts against the positioning portion 111 of the mounting sleeve 11, while a bottom surface of the ring portion 43 abuts against the inner surface of the cover plate 12 and the bottom base 2. In such a manner, the resilient buffering member 4 is clamped among the cover plate 12, the positioning portion 111 and the bottom base 2. Furthermore, the cover plate 12 simultaneously covers part of the positioning portion 111 and the limiting portions 45 to support the same.

The bottom base 2 has an annular stepped portion 21 protruding from the top surface 23 thereof, as shown in FIG. 3. The axle 20 and the stepped portion 21 are coaxial. The stepped portion 21 extends into the opening 120 and is flush with the inner surface of the cover plate 12, so that the bottom surface of the ring portion 43 abuts against the stepped portion 21 and the inner surface of the cover plate 12. In such a manner, the resilient buffering member 4 is clamped among the cover plate 12, the positioning portion 111 and the stepped portion 21. The diameter of the opening 120 is slightly larger than that of the stepped portion 21, so that a clearance is formed between a periphery of the opening 120 and an outer periphery of the stepped portion 21.

It is designed that the resilient buffering member 4 is assembled in the mounting base 1 with the protruding portions 41 thereof extending through the cover plate 12, so that the resilient buffering member 4 and the mounting base 1 are fixed in the circumferential direction of the axle 20. Hence, relative rotation between the resilient buffering member 4 and the mounting base 1 about the axis (z) of the axle 20 can be prevented. Specifically, although the resilient buffering member 4 is tightly clamped between the mounting sleeve 11 and the bottom base 2, the resilient buffering member 4 is still capable of rotating about the axis (z) of the axle 20. Rotation of the resilient buffering member 4 can drive rotation of the bottom base 2 through a frictional force to deviate the wheel 3.

In sum, in the wheel assembly 100 of this disclosure, since the resilient buffering member 4 is disposed in the mounting base 1 and is clamped among the positioning portion 111, the cover plate 12, and the stepped portion 21, the resilient buffering member 4 can fill a mounting gap between the mounting sleeve 11 and the bottom base 2 along a top-bottom direction so as to eliminate a movement and displacement space for the bottom base 2. Even if the bottom base 2 and the wheel 3 receive an impact from the ground, through the blocking of the resilient buffering member 4, the bottom base 2 and the wheel 3 cannot upwardly knock against the mounting base 1, so that noise can be effectively reduced. Simultaneously, since the bottom surface 40 of the resilient buffering member 4 is formed with the protruding portions 41 that abut against the bottom base 2, an interference fit is formed between the resilient buffering member 4 and the bottom base 2, so that the bottom base 2 is abutted tightly and is difficult to move. This is conducive to normal movement of the wheel assembly 100. In addition, because the resilient buffering member 4 is resilient, by utilizing its characteristic of elastic deformation for absorbing impact force, vibration can be reduced as well along with the reduction of noise.

Correspondingly, because the stroller (S) uses the wheel assembly 100 of this disclosure, and since the wheels 3 of the wheel assemblies 100 are not likely to wobble, the movement of the stroller (S) is normal and smooth. Furthermore, the stroller (S) has minimal vibration and noise. It should be noted that the wheel assembly 100 of this disclosure is not limited to be applied only to the stroller (S).

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wheel assembly, comprising:
   a bottom base fixed with an axle, said axle protruding out of a top end of said bottom base;
   a wheel assembled to a bottom end of said bottom base;
   a mounting base fixed with a mounting sleeve;
   said axle being inserted into said mounting sleeve to assemble said bottom base to said mounting base; and
   a resilient buffering member sleeved on said axle and clamped between said mounting sleeve and said bottom base, said resilient buffering member having a bottom surface, and at least one protruding portion that projects downward from said bottom surface and that abuts against said bottom base.

2. The wheel assembly as claimed in claim 1, wherein said resilient buffering member further has a top surface, and at least two limiting portions that oppositely protrude upward from said top surface of said resilient buffering member and that abut against said mounting sleeve.

3. The wheel assembly as claimed in claim 2, wherein each of said limiting portions includes at least one reinforcing structure connected to said top surface of said resilient buffering member.

4. The wheel assembly as claimed in claim 1, wherein said resilient buffering member further has a ring portion for extension of said axle therethrough, said ring portion having at least one wing part that extends outwardly from an outer periphery thereof, said at least one protruding portion being formed on said wing part.

5. The wheel assembly as claimed in claim 1, wherein said at least one protruding portion includes a plurality of said protruding portions equally spaced apart in a circumferential direction of said axle.

6. The wheel assembly as claimed in claim 1, wherein said mounting sleeve has a positioning portion extending outwardly from a bottom periphery thereof and fixed to said mounting base, said resilient buffering member being clamped between said positioning portion and said bottom base.

7. The wheel assembly as claimed in claim 6, further comprising a cover plate that is fixed to a bottom portion of said mounting base and that is formed with a through hole for extension of said at least one protruding portion therethrough, said resilient buffering member being clamped among said cover plate, said bottom base and said positioning portion.

8. The wheel assembly as claimed in claim 7, wherein said at least one protruding portion extends through said through hole and protrudes out of said cover plate such that a clearance is formed between said cover plate and said bottom base.

9. The wheel assembly as claimed in claim 7, wherein a stepped portion protrudes from said top end of said bottom base, said cover plate having an opening, said stepped portion being inserted into said opening, said resilient buffering member being clamped among said cover plate, said stepped portion and said positioning portion.

10. A stroller comprising:

a stroller frame; and a wheel assembly assembled to a bottom of said stroller frame and including a bottom base fixed with an axle, said axle protruding out of a top end of said bottom base, a wheel assembled to a bottom end of said bottom base, amounting base fixed with a mounting sleeve, said axle being inserted into said mounting sleeve to assemble said bottom base to said mounting base, and a resilient buffering member sleeved on said axle and clamped between said mounting sleeve and said bottom base, said resilient buffering member having a bottom surface, and at least one protruding portion that projects downward from said bottom surface and that abuts against said bottom base.

11. The stroller as claimed in claim 10, wherein said resilient buffering member further has a top surface, and at least two limiting portions that oppositely protrude upward from said top surface of said resilient buffering member and that abut against said mounting sleeve.

12. The stroller as claimed in claim 11, wherein each of said limiting portions includes at least one reinforcing structure connected to said top surface of said resilient buffering member.

13. The stroller as claimed in claim 10, wherein said resilient buffering member further has a ring portion for extension of said axle therethrough, said ring portion having at least one wing part that extends outwardly from an outer periphery thereof, said at least one protruding portion being formed on said wing part.

14. The stroller as claimed in claim 10, wherein said at least one protruding portion includes a plurality of said protruding portions equally spaced apart in a circumferential direction of said axle.

15. The stroller as claimed in claim 10, wherein said mounting sleeve has a positioning portion extending outwardly from a bottom periphery thereof and fixed to said mounting base, said resilient buffering member being clamped between said positioning portion and said bottom base.

16. The stroller as claimed in claim 15, further comprising a cover plate that is fixed to a bottom portion of said mounting base and that is formed with a through hole for extension of said at least one protruding portion therethrough, said resilient buffering member being clamped among said cover plate, said bottom base and said positioning portion.

17. The stroller as claimed in claim 16, wherein said at least one protruding portion extends through said through hole and protrudes out of said cover plate such that a clearance is formed between said cover plate and said bottom base.

18. The stroller as claimed in claim 16, wherein a stepped portion protrudes from said top end of said bottom base, said cover plate having an opening, said stepped portion being inserted into said opening, said resilient buffering member being clamped among said cover plate, said stepped portion and said positioning portion.

* * * * *